US011511198B1

(12) United States Patent
Thacker

(10) Patent No.: US 11,511,198 B1
(45) Date of Patent: Nov. 29, 2022

(54) SYSTEMS AND METHODS FOR SHARED CONTROL OF BENEFIT-PRODUCING VIRTUAL TERRITORY THROUGH THE EXCHANGE OF FUNGIBLE DIGITAL ARTICLES

(71) Applicant: Mythical, Inc., Sherman Oaks, CA (US)

(72) Inventor: Cameron Thacker, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/695,662

(22) Filed: Mar. 15, 2022

(51) Int. Cl.
*A63F 13/795* (2014.01)
*A63F 13/335* (2014.01)
*A63F 13/56* (2014.01)

(52) U.S. Cl.
CPC .......... *A63F 13/795* (2014.09); *A63F 13/335* (2014.09); *A63F 13/56* (2014.09)

(58) Field of Classification Search
CPC ....... A63F 13/795; A63F 13/335; A63F 13/56
See application file for complete search history.

(56) References Cited

U.S. PATENT DOCUMENTS

| | | |
|---|---|---|
| 8,469,801 B2 | 6/2013 | Ocko |
| 9,452,356 B1 | 9/2016 | Tsao |
| 9,665,239 B1 | 5/2017 | Koh |
| 9,895,613 B1 | 2/2018 | Holtz |
| 10,512,843 B1 | 12/2019 | Cunningham |
| 10,518,178 B1 | 12/2019 | Cunningham |
| 10,765,948 B2 | 9/2020 | Eatedali |
| 10,850,202 B1 | 12/2020 | Koch |
| 10,861,095 B1 | 12/2020 | Koch |
| 10,946,283 B1 | 3/2021 | Meilich |

(Continued)

FOREIGN PATENT DOCUMENTS

WO 2020247002 12/2020

OTHER PUBLICATIONS

RockstarFlipper, "Ebay for Beginners, Episode #5. Top Rated Seller & Feedback"—(https://www.youtube.com/watch?v=6tk9sZ95ZW8), Mar. 19, 2017 (Year: 2017).

(Continued)

*Primary Examiner* — William H McCulloch, Jr.
*Assistant Examiner* — Ankit B Doshi
(74) *Attorney, Agent, or Firm* — Esplin & Associates, PC

(57) ABSTRACT

Systems and methods to control benefit-producing virtual territories in an online gaming platform are disclosed. Exemplary implementations may execute instances of a game; manage player accounts associated with the players; receive instructions from sets of players to obtain access to distributions associated with particular virtual territories in the game, wherein access is obtained in exchange for particular amounts of fungible digital articles; determine whether to provide a particular distribution of in-game benefits, produced in and/or by a particular virtual territory, to a particular set of players, based at least in part on whether the particular set of players continues to control the particular virtual territory; and responsive to the determination, provide the particular distribution to the particular set of players.

18 Claims, 6 Drawing Sheets

(56) References Cited

U.S. PATENT DOCUMENTS

| | | |
|---|---|---|
| 10,984,400 B1 | 4/2021 | Koch |
| 11,044,098 B1 | 6/2021 | Thacker |
| 11,045,729 B2 | 6/2021 | Yoshida |
| 11,135,516 B1 | 10/2021 | Koch |
| 11,138,580 B1 | 10/2021 | Koch |
| 11,141,664 B1 | 10/2021 | Koch |
| 11,148,058 B1 | 10/2021 | Koch |
| 11,173,401 B1 | 11/2021 | Linden |
| 11,173,402 B1 | 11/2021 | Koch |
| 11,173,404 B1 | 11/2021 | Koch |
| 11,179,638 B1 | 11/2021 | Linden |
| 11,179,640 B1 | 11/2021 | Koch |
| 11,192,033 B1 | 12/2021 | Koch |
| 11,192,036 B1 | 12/2021 | Koch |
| 11,224,818 B2 | 1/2022 | Cunningham |
| 11,229,848 B1 | 1/2022 | Koch |
| 11,238,477 B1 | 2/2022 | Koch |
| 11,288,759 B1 | 3/2022 | Linden |
| 11,325,046 B1 | 5/2022 | Koch |
| 11,328,358 B2 | 5/2022 | Koch |
| 11,383,171 B1 | 7/2022 | Stoyanov |
| 11,439,903 B2 | 9/2022 | Hayashi |
| 2005/0137015 A1 | 6/2005 | Rogers |
| 2006/0100006 A1 | 5/2006 | Mitchell |
| 2006/0190392 A1 | 8/2006 | Samid |
| 2007/0087831 A1* | 4/2007 | Van Luchene .......... G06Q 30/04 463/42 |
| 2007/0099685 A1 | 5/2007 | Van Luchene |
| 2007/0202951 A1 | 8/2007 | Bogosian |
| 2009/0318221 A1 | 12/2009 | Dhunjishaw |
| 2009/0325690 A1 | 12/2009 | Zhou |
| 2010/0205430 A1 | 8/2010 | Chiou |
| 2011/0183749 A1 | 7/2011 | Allen |
| 2011/0312424 A1 | 12/2011 | Burckart |
| 2013/0172086 A1 | 7/2013 | Ikenaga |
| 2014/0011595 A1 | 1/2014 | Muller |
| 2014/0162781 A1 | 6/2014 | Butler |
| 2015/0170112 A1* | 6/2015 | DeCastro ............. G06Q 20/381 705/39 |
| 2015/0224409 A1 | 8/2015 | Hayashida |
| 2015/0375103 A1 | 12/2015 | George |
| 2016/0005270 A1 | 1/2016 | Marr |
| 2016/0292680 A1* | 10/2016 | Wilson, Jr. ............ H04L 67/104 |
| 2016/0330034 A1 | 11/2016 | Back |
| 2017/0095741 A1 | 4/2017 | Perry |
| 2018/0178125 A1 | 6/2018 | Perry |
| 2019/0282906 A1 | 9/2019 | Yong |
| 2019/0299105 A1 | 10/2019 | Knight |
| 2019/0354945 A1* | 11/2019 | Mahajan ............. G06Q 20/367 |
| 2020/0090143 A1* | 3/2020 | Iervolino ................ H04L 63/12 |
| 2020/0160320 A1 | 5/2020 | Williams |
| 2020/0202668 A1* | 6/2020 | Cotta .................. G07F 17/3234 |
| 2020/0294133 A1 | 9/2020 | Cella |
| 2020/0311721 A1 | 10/2020 | Ow |
| 2020/0320623 A1* | 10/2020 | McGrath ............... G06Q 40/04 |
| 2021/0052981 A1 | 2/2021 | Yi |
| 2021/0106920 A1 | 4/2021 | Lim |
| 2022/0266149 A1 | 8/2022 | Linden |
| 2022/0266151 A1 | 8/2022 | Koch |
| 2022/0280874 A1 | 9/2022 | Koch |

OTHER PUBLICATIONS

Wood, Mike, "How to Leave Feedback on Ebay",—(https://www.youtube.com/watch?v=EIY1uTuAixA), May 25, 2017 (Year: 2017).

RockstarFlipper, "Ebay for Beginners, Episode #5. Top Rated Seller & Feedback"—(https://www.youtube.com/watch7v6tk9sZ95ZW8), Mar. 19, 2017 (Year: 2017).

Wood, Mike, "How to Leave Feedback on Ebay"—(https://www.youtube.com/watch?v=EIYiuTuAixA),May 25, 2017 (Year: 2017).

* cited by examiner

SYSTEMS AND METHODS FOR SHARED CONTROL OF BENEFIT-PRODUCING VIRTUAL TERRITORY THROUGH THE EXCHANGE OF FUNGIBLE DIGITAL ARTICLES

FIELD OF THE DISCLOSURE

The present disclosure relates to systems and methods to control benefit-producing virtual territories in an online gaming platform, and, in particular, shared control among groups of players, through the exchange of fungible digital articles.

BACKGROUND

Online gaming platforms are known. Distributed permanent registries are known techniques to produce a secure record or registry of rights pertaining to articles, transactions, and other information. Many types of digital articles are known.

SUMMARY

One aspect of the present disclosure relates to a system configured to control benefit-producing virtual territories in an online gaming platform. The system may include the online gaming platform, electronic storage, and/or other components. The online gaming platform may include one or more hardware processors configured by machine-readable instructions. The online gaming platform may be configured to execute instances of a game. The online gaming platform may be configured to manage player accounts associated with the players. The online gaming platform may be configured to receive instructions from sets of players to obtain access to distributions associated with particular virtual territories in the game, wherein access is obtained in exchange for particular amounts of fungible digital articles. The online gaming platform may be configured to determine whether to provide a particular distribution of in-game benefits, produced in and/or by a particular virtual territory, to a particular set of players, based at least in part on whether the particular set of players continues to control the particular virtual territory. The online gaming platform may be configured to, responsive to the determination, provide the particular distribution to the particular set of players. Access to the distributions may be lost and/or traded to other sets of players for some amount of fungible digital articles.

Another aspect of the present disclosure related to a method of controlling benefit-producing virtual territories in an online gaming platform. The method may include executing instances of a game. The method may include managing player accounts associated with the players. The method may include receiving instructions from sets of players to obtain access to distributions associated with particular virtual territories in the game, wherein access is obtained in exchange for particular amounts of fungible digital articles. The method may include determining whether to provide a particular distribution of in-game benefits, produced in and/or by a particular virtual territory, to a particular set of players, based at least in part on whether the particular set of players continues to control the particular virtual territory. The method may include, responsive to the determination, providing the particular distribution to the particular set of players. Access to the distributions may be lost and/or traded to other sets of players for some amount of fungible digital articles.

As used herein, any association (or relation, or reflection, or indication, or correspondency, or correlation) involving servers, processors, client computing platforms, players, player accounts, inventories, articles, digital articles, instructions, requests, exchanges, challenges, offers, transactions, in-game actions, virtual territories, virtual items, distributions, benefits, ownership, rights, permanent registries, metrics, metric values, operations, determinations, verifications, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
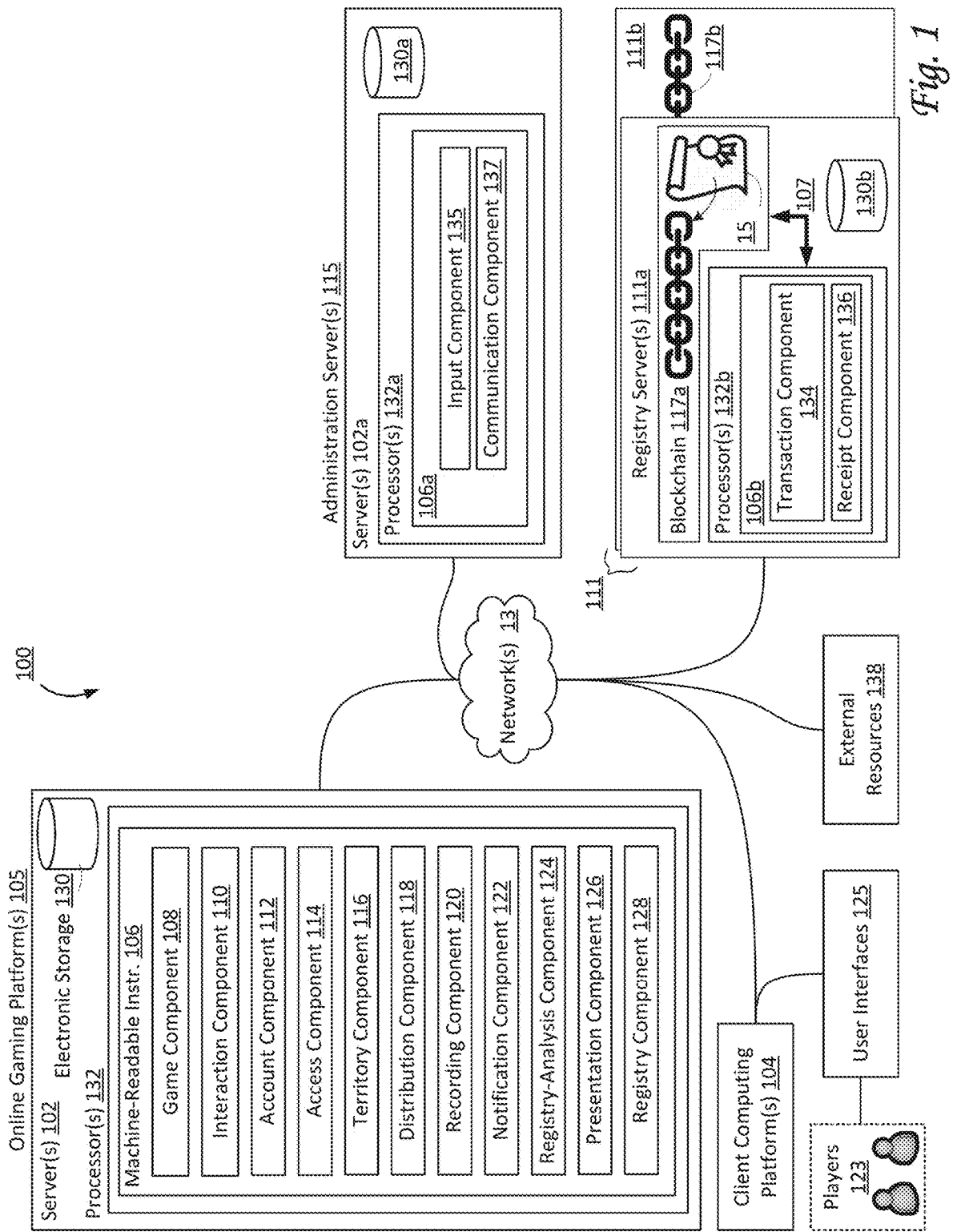
FIG. 1 illustrates a system configured to control benefit-producing virtual territories in an online gaming platform, in accordance with one or more implementations.

FIG. 1 illustrates a system 100 configured to control benefit-producing virtual territories in an online gaming platform, in accordance with one or more implementations. As used herein, the term "benefit" may represent anything of value or use in system 100, or online gaming platform 105, or registry servers 111, or anything that can be exchanged or otherwise traded for something of such value or use, whether tangible or not, whether physical and/or virtual. The term "in-game benefit" refers to any benefit of value or use within online gaming platform 105, or any benefit of value or use within a game that is executed within online gaming platform 105. By way of non-limiting example, an in-game currency and in-game virtual items are in-game benefits. As used herein, the term "virtual territory" may represent any specific location or area in online gaming platform 105 and/or in a game that is executed within online gaming platform 105, whether fixed in place (e.g., a mountain top) or not (e.g., a moving train), or a mix of both (e.g., a trading hub in a space station). In some implementations, individual virtual territories may produce (in-game) benefits, either directly (e.g., a farm, a mine, a factory, etc.) or indirectly (e.g., a toll road, a trading hub whether individual transactions are taxed, an amusement park). In some implementations, indirectly produced benefits may be provided not at the expense of some players, but rather by virtue of the design of the (economic) mechanics of a game (e.g., collect $200 when passing "GO" in Monopoly™) These virtual territories may be referred to as benefit-producing virtual territories.

As a preliminary and non-limiting example, by virtue of the systems and methods described in this disclosure, an individual player or a group of players who both own and control a particular virtual territory may collect and/or otherwise be provided with in-game benefits produced in and/or by the particular virtual territory. The longer the individual player or the group of players continue to own and control the particular virtual territory, the more distributions of in-game benefits will be provided and/or earned. In some implementations, the distribution of in-game benefits may be tied to combinations of virtual territories, or to combinations of virtual territories and one or more virtual items, or to just one or more (in-game) virtual items.

As used herein, a digital article is fungible if it is functionally and/or physically indistinguishable from another digital article. For example, a payment token such as a Bitcoin is fungible. A digital article may be non-fungible if it is unique, or one-of-a-kind. For example, a specific individual CryptoKitty™ may be non-fungible. A digital article may be semi-fungible if there is a set of a limited number of similar but distinguishable digital articles. For example, a limited-edition Blanko™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games. In some implementations, virtual territories may be considered non-fungible digital articles. Within online gaming platform 105, at least some of the virtual territories may be acquired and/or otherwise obtained in exchange for some amount of a specific type of fungible digital article. This specific type of fungible digital article may be implemented as a specific type of fungible token on one or more permanent registries such as blockchain 117a.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be tracked, recorded, and/or otherwise registered on one or more permanent registries. As such, a unique digital article may be a registry-tracked unique digital article.

Individual unique digital articles may be associated and/or correlated with another entity (which may be referred to as a "correlated entity") by virtue of technology provided and/or supported by the one or more permanent registries on which the rights pertaining to the individual unique digital articles is tracked (including but not limited to smart contracts and/or other executable code on the one or more permanent registries). Accordingly, rights pertaining to a unique digital article may correlate to the provision of one or more rights (e.g., usage rights) with respect to the correlated entity. Transactions involving a unique digital article recorded on a permanent registry may correlate to certain transactions (or modifications) of the correlated entity, and/or vice versa. For example, exchanging and/or trading a particular virtual territory within a game (from one set of players to another set of players) may correspond to a transaction recorded on the permanent registry (of a unique digital article that is correlated to the particular virtual territory). In some implementations, this transaction may include a transfer of the specific type of fungible token that implements the specific type of fungible digital article.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, a correlated entity may be an art work, a ticket to an event, a subscription to certain media content, a bundle of rights related to captured audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, registry server(s) 111, administration server(s) 115, client computing platform(s) 104, user interface(s) 125, server(s) 102, external resource(s) 138, and/or other components. Players 123 (also referred to as users)

may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130*a* and electronic storage 130*b* may be similar to electronic storage 130 as described elsewhere in this disclosure, though included in administration servers 115, and registry servers 111, respectively, as depicted in FIG. 1.

Instances of games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder, such as an owner) may sell in-game digital items (e.g., characters, weapons, resources, etc.) to players 123 of online gaming platform 105.

Referring to the game and to online gaming platform 105, in some implementations, individual players may own and/or control individual unique digital articles, correlated entities, and/or other virtual items, and exchange these with (or to) other individual players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players (including exchanging virtual items through player-to-player challenges). Due to an exchange, ownership of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, access to distributions (also referred to as "distribution rights").

In some implementations, distribution rights of (unique) digital articles may reflect rights held by one or more of the players 123 to receive certain distributions (e.g., of in-game benefits) upon the occurrence of certain events. For example, such events may include exchanges involving the particular digital articles. In some implementations, the distributions may occur subsequent or responsive to a particular event or action (such as, e.g., a sale of a particular digital article), e.g., within online gaming platform 105. As used herein, in-game benefits may include one or more of a portion of the proceeds of the particular event or action, a fee related to the particular event or action, a minimum payment triggered by the occurrence of the particular event or action (or a set of particular events or actions), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries may receive something of value and/or use. The distribution may include one or more virtual currencies such as virtual tokens, virtual stars, virtual points, virtual real-world currencies (e.g., US Dollars), and/or other benefits.

In some implementations, (unique) digital articles, correlated entities, and/or other virtual items may include and/or be virtual items that are not fungible and may be usable within online gaming platform 105. In some implementations, these may represent (three-dimensional) in-game player-controllable characters that can interact with other (in-game) virtual items within online gaming platform 105. In some implementations, virtual items may include one or more of territories, weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

Registry server(s) 111 (e.g., registry server 111*a*, registry server 111*b*, and so forth) may be used to implement one or more permanent registries, including but not limited to blockchain 117*a*, blockchain 117*b* (partially visible in FIG. 1), and so forth. In some implementations, one or more permanent registries may be decentralized and/or immutable registries. In some implementations, blockchain 117*a* and blockchain 117*b* may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117*a*. For example, the smart contracts may be stored on blockchain 117*a*, blockchain 117*b*, and/or another permanent registry. In some implementations, the distributed computing platform may be the EOSIO platform. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the distributed computing platform may be the POLYGON platform. In some implementations, the distributed computing platform may be similar to or based on the POLYGON platform. In some implementations, the virtual machine may be a distributed and/or decentralized virtual machine.

In some implementations, at least one of the permanent registries implemented by registry servers 111 is a private permissioned permanent registry (e.g., a private permissioned blockchain). The private permissioned permanent registry may be configured to record information. The recorded information may include information pertaining to unique digital articles that are associated and/or correlated with in-game player-controllable characters that are configured to be used in an instance of a game. The recorded information may include rights pertaining to the unique digital articles. Implementing the in-game actions in the instance of the game may include, for at least some of the in-game actions implemented in the instance of the game, effectuating modifications to the recorded information pertaining to the unique digital article. For example, ownership and/or usage rights may be modified. In some implementations, a unique digital article may be removed from one permanent registry and added or recorded on another permanent registry. In some implementations, at least one of the permanent registries implemented by registry servers 111 is a public permanent registry (e.g., a public blockchain). The public permanent registry may be configured to be part of either EOSIO mainnet, ETHEREUM mainnet, ETHEREUM 1.5, ETHEREUM 2.0, a derivative of ETHEREUM 2.0 that is configured to perform transactions of Ether (ETH) between accounts, or a derivative of EOSIO that is configured to perform transactions of EOS between different accounts.

Elements of blockchain 117*a* or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only. In some implementations, existing blocks of one or more permanent registries implemented by registry servers 111 can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111*a* may include one or more of electronic storage 130*b*, processor(s) 132*b*, machine-readable instructions 106*b*, (node of) blockchain 117*a*, and/or other components. Machine-readable instructions 106*b* may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117*a* may include a unique digital article 15 (by way of non-limiting example, unique digital article 15 may correspond to access to distributions of benefits produced by a particular virtual territory, and ownership of unique digital article 15 may have been recorded on blockchain 117*a*, e.g., as being obtained by a set of players in exchange for an amount of fungible digital articles). Registry server 111*b* may include similar components as registry server 111*a*, including but not limited to blockchain 117*b* and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, an account component 112, an access component 114, a territory component 116, distribution component 118, a recording component 120, a notification component 122, a registry-analysis component 124, a presentation component 126, a registry component 128, and/or other instruction components. Processor(s) 132*a* and processor(s) 132*b* may be similar to processor(s) 132 as described elsewhere in this disclosure, though included in administration servers 115 and registry servers 111, respectively, as depicted in FIG. 1. Machine-readable instructions 106*a* and machine-readable instructions 106*b* may be similar to machine-readable instructions 106 as described elsewhere in this disclosure, though included in administration servers 115 and registry servers 111, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to in-game action instructions for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. The topography may include virtual territories, including but not limited to benefit-producing virtual territories. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. In some implementations, the topography may include one or more restricted areas that are only accessible under certain conditions. In some implementations, player-controlled elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controlled elements) and/or other items, to perform in-game actions within the virtual space. By way of non-limiting illustration, players 123 may include the first player and the second player that interact with online gaming platform 105. The first player and the second player may control digital articles in a game hosted by online gaming platform 105. In some implementations, account inventories may be managed (at least in part) using blockchain 117*a*. For example, ownership rights (and/or other types of rights) of individual virtual items included in an individual account inventory may be recorded on blockchain 117*a*. In some implementations, at least some individual virtual items (also referred to as correlated entities) may correlate to individual unique digital articles (that may be tracked by registry servers 111). In some implementations, individual account inventories may correspond to individual smart contracts stored on blockchain 117*a*.

Interaction component 110 may be configured to enable, facilitate, and/or implement in-game actions by players 123 in instances of games. In some implementations, interaction component 110 may be configured to operate in response to instructions by players 123. Interaction component 110 may be configured to receive instructions from players 123, e.g., in-game action instructions to perform in-game actions in the instance of the game. By way of non-limiting example, in-game actions may include one or more of performing a move, a dance, a movement, and/or another action within the game, accessing a level or area within the game, using a particular item, weapon, or another resource within the game, participating in a particular game mode (e.g., a Battle Royale mode), join a particular mission or team, engage in a particular type of exchange and/or challenge between players, and/or other in-game actions. For example, one or more players may interact within online gaming platform 105 to build, create, gather, find, combine, and/or otherwise generate content (i.e., player-generated content). In some implementations, a player may request access to a particular type or section of a store and/or marketplace within online gaming platform 105.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players. For example, an acceptance may be required to accept a particular offer to partake in an activity or agreement. In some implementations, interaction component 110 may be configured to receive indications of acceptances and/or other agreements from players.

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items and so forth. Individual players may control one or more virtual items in their individual account inventories. In some implementations, the first account inventory includes one or more unique digital articles (e.g., a first unique digital article, other unique digital articles, etc.). In some implementations, the second account inventory includes one or more unique digital articles (e.g., a second unique digital article, other unique digital articles, etc.). The first unique digital article may be correlated with a first in-game player-controllable character configured to be used (e.g., played with) in the instance of the game. The second unique digital article may be correlated with a second in-game player-controllable character configured to be used (e.g., played with) in the instance of the game, and so forth. In some implementations, a particular player account may be associated with a set of multiple players. For example, a group of players may share the particular player account.

Access component 114 may be configured to receive instructions from one or more players 123. For example, individual instructions may be to obtain access to distributions associated with individual virtual territories. For example, individual distributions may include one or more benefits. In some implementations, the one or more benefits may include in-game benefits. In some implementations, the one or more benefits may include in-game benefits produced in and/or by particular virtual territories. For example, in-game benefits may include benefits that are available by virtue of ownership and/or control of virtual territories. Assume access component 114 received a particular instruction from a particular set of players 123 to obtain access to the distributions associated with a particular virtual territory. Responsive to receiving this particular instruction, access component 114 may be configured to exchange this access to the distributions associated with this particular virtual territory to this particular set of players 123. In some implementations, this kind of exchange may be for fungible digital articles, e.g., a particular amount of fungible digital articles, to be provided by the particular set of players 123. In some implementations, this kind of exchange may reduce the supply of fungible digital articles by some amount (up to the particular amount of fungible digital articles). For example, in some implementations, these fungible digital articles may be implemented as fungible tokens on a permanent registry such as blockchain 117a (and may be tradeable on this permanent registry, or even on any permanent registry). This kind of exchange may effectuate burning or otherwise destroying (a fraction of) the particular amount of these fungible tokens. This reduction in supply may increase the value of the remaining fungible tokens, especially if these types of tokens are the only tokens that can be used to obtain access to the distributions associated with virtual territories.

In some implementations, responsive to receiving a particular instruction, access component 114 may be configured to perform one or more verifications prior to exchanging a particular access to a particular set of players 123. By way of non-limiting example, one of these verifications may verify that a particular player or group of players can provide or have provided the required amount of fungible digital articles. By way of non-limiting example, these verifications may verify other conditions, limitations, and/or restrictions placed on these exchanges by the (economic) mechanics of the particular game. In some implementations, distributions may occur at regular intervals or at predetermined moments. For example, assume a particular set of players obtained access to the distributions of a particular farm in the game. Provided that this particular set of players continues to control this farm, a distribution of certain in-game benefits may be provided to the particular set of players every week, or month, or quarter, or other scheduled period. In the event this particular set of players loses control of the farm to another set of players, and this other set of players obtains access to these distributions (e.g., in exchange for a certain amount of fungible digital articles), these certain in-game benefits may be provided to this other set of players every week, or month, or quarter, or other scheduled period. System 100 and/or online gaming platform 105 may assert some control over the in-game economy by adjusting the in-game benefits over time and/or by adjusting the required amount of fungible digital articles). In some implementations, the particular amount of fungible digital articles required for exchanging the particular access to the distributions associated with a particular virtual territory in the game change according to a monotonic function over time. In some cases, this function may be monotonically increasing. In some cases, this function may be monotonically decreasing.

Territory component 116 may be configured to determine whether particular set of players control particular virtual territories. For example, operations of other components of system 100 may be based on (e.g., responsive to) determinations by territory component 116. Determinations by territory component 116 may depend on the particular game within online gaming platform 105. In some implementations, a set of players may demonstrate and/or maintain control by occupying a particular area or location, e.g., within the center of a particular virtual territory. For example, occupying headquarters may be implemented in different ways, including but not limited to having at least a predetermined minimum number of players present simultaneously within a particular area such as these headquarters. For example, occupying headquarters may be implemented by having at least a predetermined percentage of the individual players in a particular set of players present simultaneously within a particular area such as these headquarters. For example, occupying headquarters may be implemented by having a majority of the players that are present simultaneously within a particular area such as these headquarters be part of a particular set of players. In some implementations, a set of players may demonstrate and/or maintain control by owning and/or holding a particular virtual item in their possession, or their account inventories. For example, control over an area may be symbolically linked to possession of a particular flag or banner. The specific way that a determination of control is made may depend not only on each game, but also on the type of virtual territory involved. For example, control over a farm may be established in a different manner than control over a trading hub or marketplace.

Distribution component 118 may be configured to determine whether to provide distributions, e.g., in accordance with access to individual particular distributions. In some implementations, a distribution may include a set of one or more (in-game) benefits. In some implementations, distribution component 118 may be configured to provide a distribution to a particular set of players. In some implementations, for a particular virtual territory, determinations by distribution component 118 may include verifications, including but not limited to a verification whether a particular set of players controls (or continues to control) the particular virtual territory. In some implementations, the verifications include a verification whether the particular set of players has access to the distributions for the particular virtual territory (e.g., owns this particular access, which may be verified through information recorded on a permanent registry such as blockchain 117*a*). In some implementations, distribution component 118 may be configured to decline to provide a distribution, e.g., because a particular set of players no longer controls a particular virtual territory, or no longer owns the access to the particular distribution for the particular virtual territory. In some implementations, a particular distribution may include a portion of the particular amount of fungible digital articles used to obtain the access to the particular distribution. For example, a particular set of players may exchange some amount of fungible digital articles (say, 100 tokens) to obtain access to the distributions of a particular virtual territory. Each week, for fifty weeks, the distribution of in-game benefits to the particular set of players includes, among other in-game virtual items, 1 of these tokens, such that at the end of fifty weeks, fifty tokens have been returned to the particular set of players. In such a case, the exchange of fungible digital articles is a two-way exchange (until and unless the particular set of players loses control over the particular virtual territory). In this example, the other fifty tokens are not returned, and may have been taken out of circulation, thereby reducing the supply of tokens (i.e., fungible digital articles) in this game, or rather in system 100. In other examples, the entirety of the particular amount of fungible digital articles used to obtain the access to the particular distribution may be returned to the particular set of players over some predetermined amount of time.

In some implementations, distribution component 118 may be configured to distribute and/or otherwise provide one or more of information, benefits, access to in-game content, access to game-specific communication channels, certificates, rewards, awards, prizes, distribution gains, and/or virtual items to players 123. In some implementations, distributions may be based on and/or responsive to actions by other components of system 100, including but not limited to registry server 111, a particular permanent registry, and/or registry-analysis component 124. For example, online gaming platform 105 may determine a particular player is eligible to receive one or more rewards or awards. Distribution component 118 may distribute the one or more rewards or awards in accordance with the determined eligibility. For example, a reward may be a participation reward. For example, an award may be an attendance award. For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive a distribution in accordance with those distribution rights. In some implementations, the in-game benefits for a particular virtual territory may change per distribution (e.g., gradually go up, or be tied to some market indicator).

Recording component 120 is configured to record information, assets, transactions, and/or digital articles on permanent registries, including but not limited to virtual territories and access to distributions related to virtual territories. In some implementations, the information may include executable code, such as, e.g., smart contracts. In some implementations, recording component 120 may record and/or modify rights pertaining to articles. In some implementations, recording component 120 may be configured to receive (recordation) instructions to perform a recordation (e.g., of a unique digital article or a smart contract on a permanent registry). For example, recording component 120 may receive, from a first player, a recordation instruction to record and/or modify rights pertaining to a first unique digital article on a first permanent registry (such as, e.g., blockchain 117*a*). In some implementations, recording component 120 may receive such instructions from online gaming platform 105 and/or other components of system 100. For example, a particular instruction to record (rights pertaining to) a particular unique digital article may correspond to the issuance and/or creation of that particular unique digital article. When a unique digital article or other digital article is issued and/or created, recording component 120 may record its ownership on a particular permanent registry. In some implementations, a particular instruction to modify rights pertaining to a particular unique digital article may correspond to an exchange of that particular unique digital article (e.g., between two players, or between two sets of players).

In some implementations, recording component 120 may be configured to record executable code on a particular permanent registry, such as, e.g., blockchain 117*a*. In some implementations, particular executable code may be a particular smart contract. The particular smart contract may interact with other components of system 100, including but not limited to online gaming platform 105. A particular smart contract may be configured to perform one or more evaluations based on received information. In some implementations, the one or more evaluations may evaluate whether to provide distributions to groups of players. In some implementations, access to distributions may be implemented as a smart contract, and owned by one or more players.

Notification component 122 may be configured to notify players. For example, notification component 122 may notify players 123 in response to events, distributions, in-game action instructions, and/or other activities in system 100. In some implementations, a player may be notified responsive to an in-game action (as instructed through an in-game action instruction) not being permitted or not being performed. For example, a set of players may be notified when and why a distribution is declined (by distribution component 118). In some implementations, actions by notification component 122 may be performed responsive to particular actions, results, determinations, and/or decisions from other components of system 100, including but not limited to distribution component 118 and/or registry-analysis component 124. For example, notification component 122 may respond to a particular in-game action instruction (by a particular player, and pertaining to a particular unique digital article) with a particular response such that, responsive to a particular determination, the particular response notifies the particular player accordingly.

Registry-analysis component 124 may be configured to determine whether one or more unique digital articles are recorded (on a particular permanent registry) as being owned by a particular player and/or account. For example, registry-analysis component 124 may determine whether a particular virtual territory is currently recorded on a private permissioned permanent registry as being owned by a particular set of players. Alternatively, and/or simultaneously, registry-analysis component 124 may determine whether access to the distributions for the particular virtual territory is currently recorded as being owned by the particular set of players. In some implementations, registry-analysis component 124 may be configured to analyze recordations and other transactions on one or more permanent registries, e.g., by retrieving recorded information from the one or more permanent registries and analyzing whether any of the recorded transactions pertain to a particular article (e.g., a virtual territory). In some implementations, determinations by registry-analysis component 124 may be performed responsive to particular actions or results from other components of system 100. In some implementations, actions by other components of system 100, including but not limited to distribution component 118, may be responsive to determinations by registry-analysis component 124. In some implementations, determinations by registry-analysis component 124 may occur in real-time or near-real-time as needed for a particular in-game action instruction. In some implementations, determinations by registry-analysis component 124 may occur as needed when rights pertaining to (unique) digital articles are modified, and results of such determinations are stored for later use by, e.g., online gaming platform 105, e.g., to be used when responding to a future in-game action instruction.

Presentation component 126 may be configured to present interfaces (e.g., user interfaces 125) to players, e.g., through client computing platforms 104 associated with the respective players. In some implementations, presentation component 126 may be configured to effectuate presentations of interfaces to players 123. In some implementations, presentations by presentation component 126 may be performed jointly (or at least in some cooperative manner) with one or both of game component 108 and/or interaction component 110. In some implementations, presentation component 126 may present offers (e.g., for exchanges with other players) to particular players.

Registry component 128 may be configured to generate sets of instructions for registry servers 111 (e.g., registry server 111*a*) and/or one or more permanent registries (e.g., blockchain 117*a*). In some implementations, registry component 128 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117*a*). In some implementations, one or more of these instructions may call and/or otherwise invoke a method or function of a smart contract on the one or more permanent registries (e.g., blockchain 117*a*). In some implementations, these instructions may instruct registry servers 111 to record and/or modify unique digital articles, transactions, and/or rights on one or more permanent registries, or to analyze ownership as recorded on the one or more permanent registries. In some implementations, these instructions may instruct registry servers 111 to record and/or modify sets of usage information (e.g., ownership rights) pertaining to unique digital articles. For example, registry component 128 may transfer a particular set of instructions that, upon execution by blockchain 117*a*, issues a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights. For example, registry component 128 may transfer a particular set of instructions that, upon execution by blockchain 117*a* and blockchain 117*b*, remove a particular unique digital article from blockchain 117*a* and add the particular unique digital article to blockchain 117*b*. For example, registry component 128 may transfer a particular set of instructions that, upon execution by blockchain 117*a* and blockchain 117*b*, analyze whether a particular player or set of players owns one or more particular unique digital articles.

Receipt component 136 may be configured to receive (sets of) instructions to add, modify, analyze, and/or remove recorded information (e.g., rights) in blockchain 117*a*. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117*a* and other components of system 100. For example, in some implementations, API 107 may support methods or functions that are implemented as function calls to smart contracts stored on blockchain 117*a*. For example, in some implementations, API 107 may support methods or functions that analyze whether a particular player owns one or more particular unique digital articles, one or more particular types of unique digital articles, and/or a particular collection of multiple unique digital articles. In some implementations, receipt component 136 may be arranged, organized, and/or otherwise included in registry server 111 and/or blockchain 117*a*.

Transaction component 134 may be configured to record information, including but not limited to (ownership) rights pertaining to digital articles, e.g., on one or more permanent registries, such as blockchain 117*a*. In some implementations, transaction component 134 may record information on electronic storage 130*b*. In some implementations, transaction component 134 may record information on blockchain 117*a*. The information may include ownership rights, distribution rights, other rights, and/or other information. For example, particular recorded information may reflect rights pertaining to a particular digital article by a particular player or group of players. For example, a particular unique digital article may represent a three-dimensional in-game player-controllable item or character that can interact with other virtual items within online gaming platform 105. For example, a particular unique digital article may represent a virtual territory within online gaming platform 105. Recorded information may be specific to a digital article (i.e., article-specific). For example, distribution rights for a particular digital article may designate rights to certain distributions of benefits upon a specifically defined in-game action (e.g., an exchange between players) involving the particular digital article.

In some implementations, transaction component 134 may be configured to record information in blockchain 117*a*. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117*a* no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific information (e.g., ownership rights, distribution rights, and/or other information) for particular digital articles. In some implementations, transaction component 134 may be configured to access blockchain 117a to obtain the article-specific information (that are recorded on blockchain 117a, e.g., in one or more smart contracts).

Input component 135 may be configured to receive user input from administrative users. For example, the user input may include entry and/or selection of particular information regarding any entity or object that interacts with any part of system 100 and/or plays a part in the operation of system 100.

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Figure 3A:
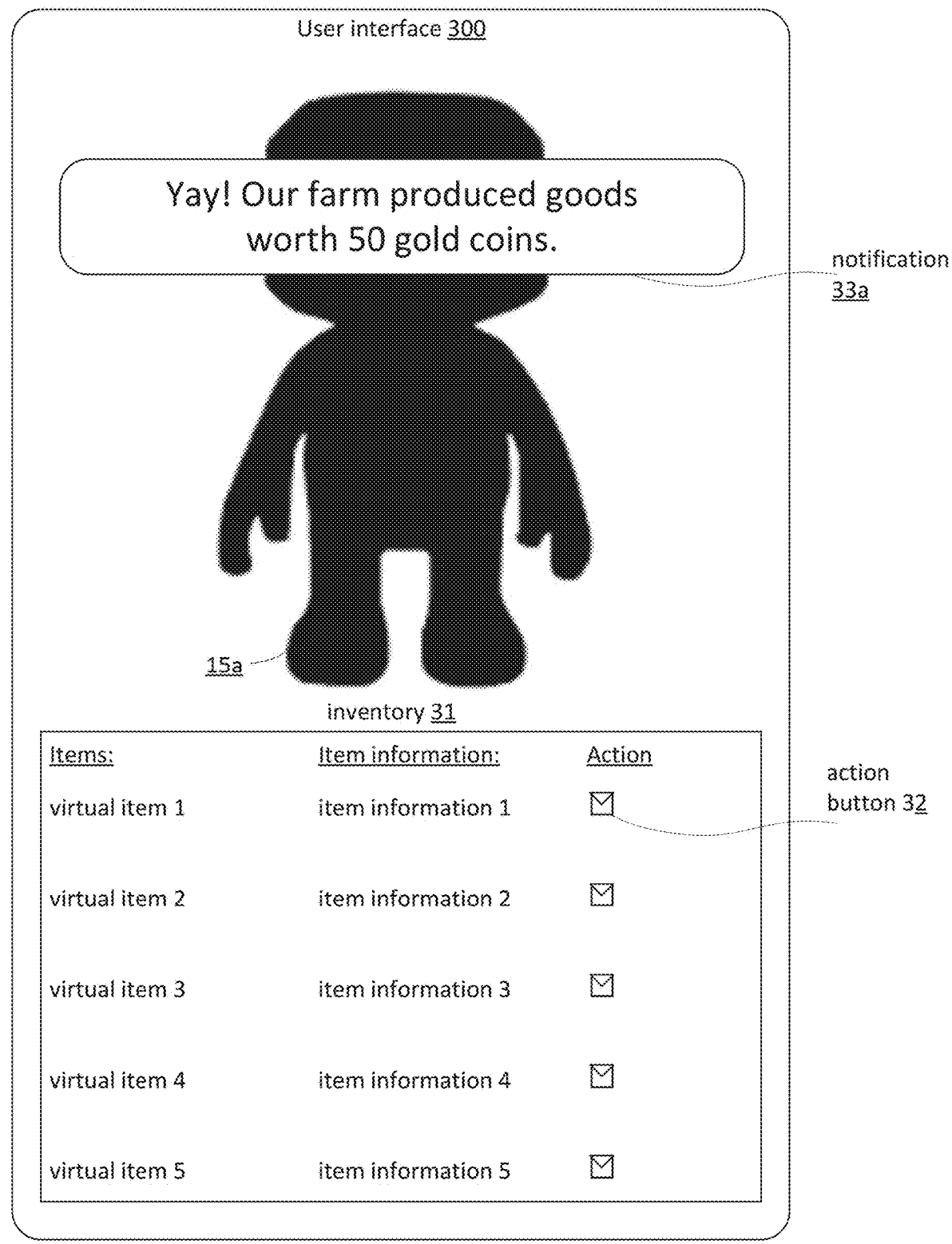
FIGS. 3A-3B illustrate example implementations of player interfaces, as may be used by a system configured to control benefit-producing virtual territories in an online gaming platform, in accordance with one or more implementations.

FIG. 3A illustrates an example implementation of a user interface 300 as may be used by system 100, in accordance with one or more implementations. User interface 300 may enable a particular player (say, "Alice", not depicted) to view and/or use an account inventory controlled by the particular player. User interface 300 may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32 (which initiates an in-game action instruction). Upon engagement by Alice, in-game action instruction button 32 may instruct "virtual item 1" to be used for a particular purpose (e.g., through a text field or a dropdown menu, as indicated by a triangle in a box). For example, Alice may instruct in-game information to be displayed about unique digital article 15a, and unique digital article 15a may be associated with a player-controllable in-game character that is also depicted in user interface 300. User interface 300 as depicted may further include graphical user interface elements such as, by way of non-limiting example, a notification element 33a. Alice may be part of a group of players who own and control a farm and the benefits produced by the farm. Upon a new distribution of these benefits, Alice may be notified as indicated by notification 33a, labeled "Yay! Our farm produced goods worth 50 gold coins." Note that if Alice's group of players lost control over the farm, no such benefits would be provided. Note that if another group of players obtained access to these distributions, no such benefits would be provided to Alice's group of players.

Figure 3B:
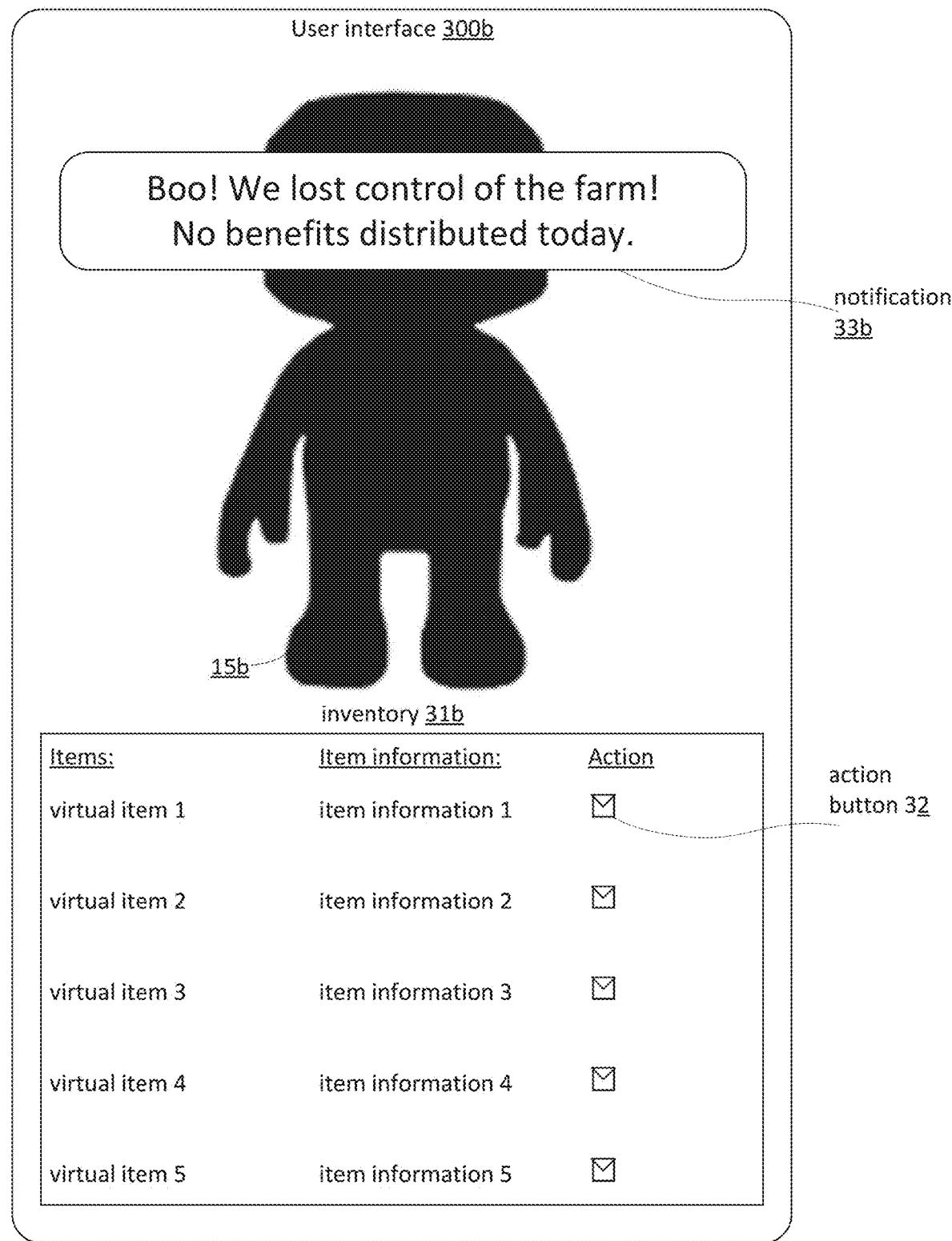

FIG. 3B illustrates an example implementation of a user interface 300b as may be used by system 100, in accordance with one or more implementations. User interface 300b may enable a particular player (say, "Bob", not depicted) to view and/or use an account inventory and/or one or more unique digital articles controlled by the particular player. User interface 300b may include a section or field for account inventory 31b, and/or other graphical user interface elements. As depicted, account inventory 31b may include a list of different virtual items and/or articles currently controlled by Bob, including virtual items 1-2-3-4-5. Account inventory 31b further depicts item information regarding these virtual items, as indicated by item information 1-2-3-4-5, which correspond to virtual items 1-2-3-4-5, respectively. Account inventory 31b as depicted may further include graphical user interface elements such as, by way of non-limiting example, an action button 32 (which initiates an in-game action instruction). Upon engagement by Bob, in-game action instruction button 32 may request "virtual item 1" to be used for a particular purpose (e.g., through a text field or a dropdown menu, as indicated by a triangle in a box). For example, Bob may instruct in-game information to be displayed about unique digital article 15b, and unique digital article 15b may be associated with a player-controllable in-game character that is also depicted in user interface 300b. User interface 300b as depicted may further include graphical user interface elements such as, by way of non-limiting example, a notification element 33b. Bob may be part of a group of players who own and control a farm and are periodically provided with the benefits produced by the farm. Upon a loss of control of the farm, Bob may be notified, as indicated by notification 33b, labeled "Boo! We lost control of the farm! No benefits distributed today."

Figure 5A:
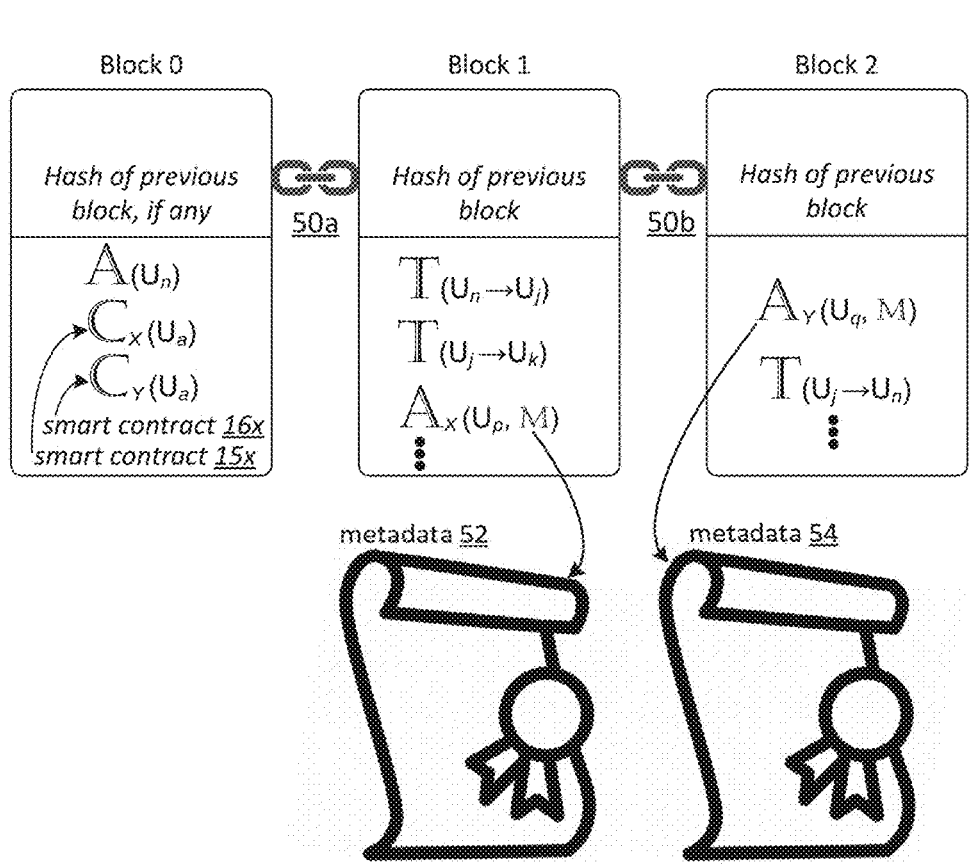
FIGS. 5A-5B illustrate exemplary permanent registries, as may be used by a system configured to control benefit-producing virtual territories in an online gaming platform, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "n" ($U_n$). A second digital article, a smart contract 15x is assigned to player "a" ($U_a$), and a third digital article, a smart contract 16x, is assigned to player "a" ($U_a$), which may be an administrative user. For example, smart contract 15x and smart contract 16x may represent access to distributions of a first and second particular virtual territory, respectively. For example, the first particular virtual territory may be a farm, and the second particular virtual territory may be a space station that includes a trading hub. Smart contract 15x and smart contract 16x may have been posted to blockchain 117c by a component similar to record component 134.

For example, the articles in block 0 may include individual ownership rights recorded for particular digital articles within an online gaming platform, similar to or the same as online game platform 105. Block 1 is connected to block 0 (as indicated by a link 50*a*), for example by including an address of block 1 in block 0, or vice versa. Likewise, block 1 is connected to block 2, as indicated by a link 50*b*. In block 1, a transaction to smart contract 15*x* (indicated by "Ax") is recorded. Transaction Ax to smart contract 15*x* may assign smart contract 15*x* to a first set of players labeled "p", with the unique digital article being defined by metadata 52. Here, metadata 52 may define which players are included in the first set of players, as well as particulars regarding the first particular virtual territory (here, the farm). In block 1, another transactions from player "n" to player "j", and from player "j" to player "k" are also recorded. In block 2, several transactions may be recorded: a transaction from player "j" to player "n", and a transaction to smart contract 16*x* (indicated by "$A_Y$") is recorded. Transaction $A_Y$ to smart contract 16*x* may assign smart contract 16*x* to a second set of players labeled "q", with the unique digital article being defined by metadata 54. Here, metadata 54 may define which players are included in the second set of players, as well as particulars regarding the second particular virtual territory (here, the space station and trading hub).

Figure 5B:
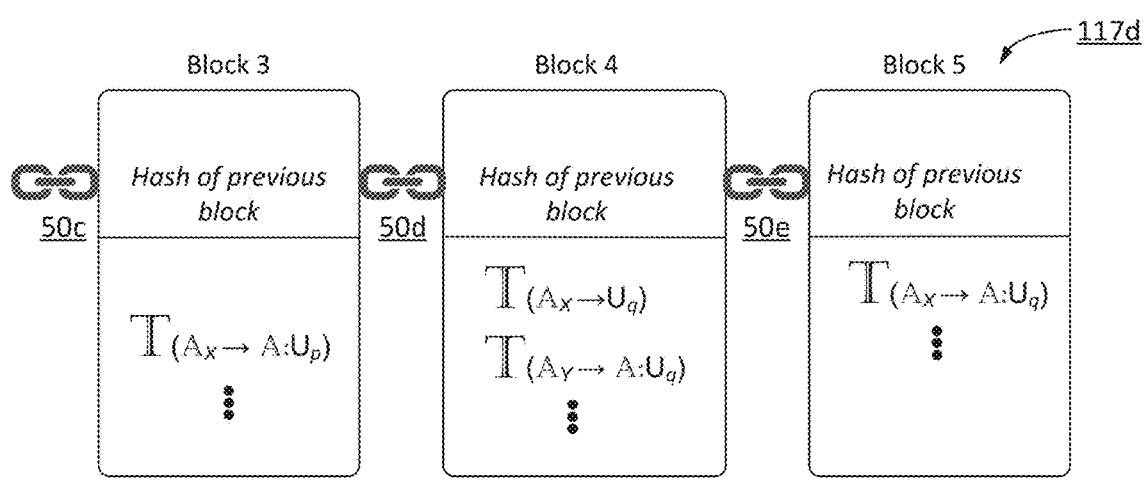

By way of non-limiting example, FIG. 5B illustrates a blockchain 117*d* that includes several blocks (block 3, block 4, block 5), that have been appended to blockchain 117*c*. Block 3 may be connected to block 2 (as indicated by link 50*c*), block 4 may be connected to block 3 (as indicated by a link 50*d*), and block 5 may be connected to block 4 (as indicated by a link 50*e*). In block 3, another transaction may be recorded regarding a distribution of in-game benefits or assets, produced by the unique digital article indicated by "Ax" and defined by metadata 52, to the first set of players "p". Block 4 includes a transaction (indicated by a capital "T") of unique digital article "Ax" to the second set of players "q". Additionally, block 4 includes a transaction regarding a distribution of in-game benefits or assets, produced by the unique digital article indicated by "Ay" and defined by metadata 54, to the second set of players "q". Block 5 includes a transaction regarding a distribution of in-game benefits or assets, produced by the unique digital article indicated by "Ax", to the current owners: second set of players "q".

Figure 4:
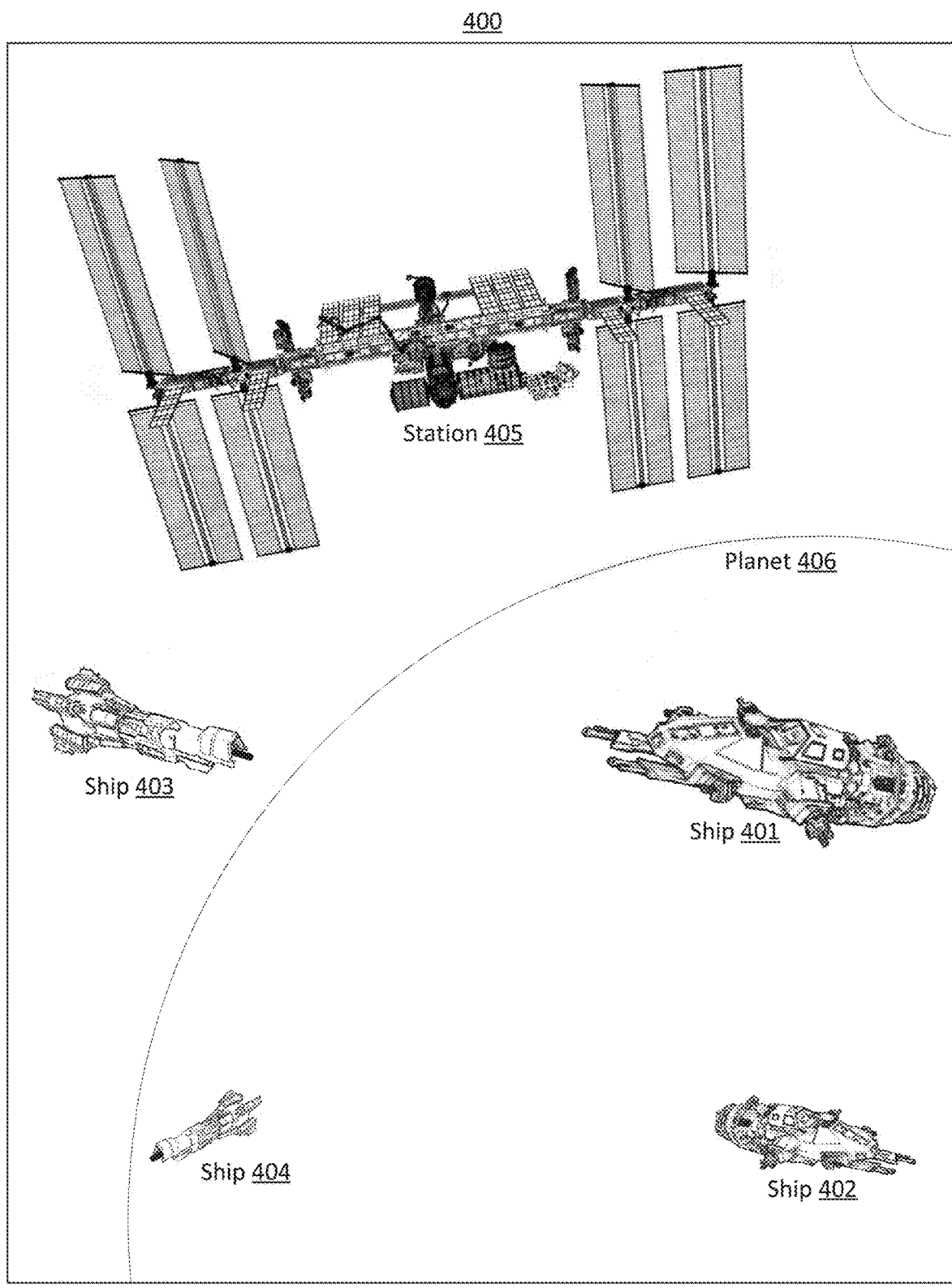
FIG. 4 illustrates an exemplary view of interactive gameplay in an instance of a game, as may be used by a system configured to control benefit-producing virtual territories in an online gaming platform, in accordance with one or more implementations.

By way of non-limiting example, FIG. 4 depicts a view 400 of interactive gameplay in an instance of a game as may be used by system 100. The game depicted here takes place in space near a planet 406, with a space station 405 orbiting. Space station 405 is a virtual territory that produced in-game benefits by virtue of being a trading hub in this game (e.g., transactions performed in space station 405 may be taxed, and these taxes may form the in-game benefits). At some point during gameplay, a first faction of players takes control of space station 405 and obtains access to distributions of the in-game benefits. This first faction of players may use a fleet of their ships, including a ship 403 and a ship 404 to maintain control and ownership of space station 405. As long as this first faction of players maintains control, distributions of in-game benefits may continue to be provided to the first faction of players, e.g., at regular intervals. However, as soon as a second faction of players gains control of space station 405, these distributions to the first faction of players will cease. Upon obtaining access to the distributions of space station 405, e.g., in exchange for a particular amount of fungible digital articles, the distributions of in-game benefits produced by space station 405 may be provided to the second faction of players, e.g., periodically (as long as the second faction of players maintains control of space station 405).

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102*a*, processors 132*a*, machine-readable instructions 106*a*, electronic storage 130*a*, and/or other components. Server(s) 102*a* may be configured by machine-readable instructions 106*a*. Machine-readable instructions 106*a* may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or player one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 134, 135, 136, and/or 137, and/or other components. Processor(s) 132 may be configured to execute components 108, 110, 112, 114, 116, 118, 120, 122, 124, 126, 128, 134, 135, 136, and/or 137, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 134, 135, 136, and/or 137 are illustrated in FIG. 1 as being implemented within a single processing unit, in implementations in which processor(s) 132 includes multiple processing units, one or more of components 108, 110, 112, 114, 116, 118, 120, 122, 124, 126, 128, 134, 135, 136, and/or 137 may be implemented remotely from the other components. The description of the functionality provided by the different components 108, 110, 112, 114, 116, 118, 120, 122, 124, 126, 128, 134, 135, 136, and/or 137 described below is for illustrative purposes only, and is not intended to be limiting, as any of components 108, 110, 112, 114, 116, 118, 120, 122, 124, 126, 128, 134, 135, 136, and/or 137 may provide more or less functionality than is described. For example, one or more of components 108, 110, 112, 114, 116, 118, 120, 122, 124, 126, 128, 134, 135, 136, and/or 137 may be eliminated, and some or all of its functionality may be provided by other ones of components 108, 110, 112, 114, 116, 118, 120, 122, 124, 126, 128, 134, 135, 136, and/or 137. As another example, processor(s) 132 may be configured to execute one or more additional components that may perform some or all of the functionality attributed below to one of components 108, 110, 112, 114, 116, 118, 120, 122, 124, 126, 128, 134, 135, 136, and/or 137.

Figure 2:
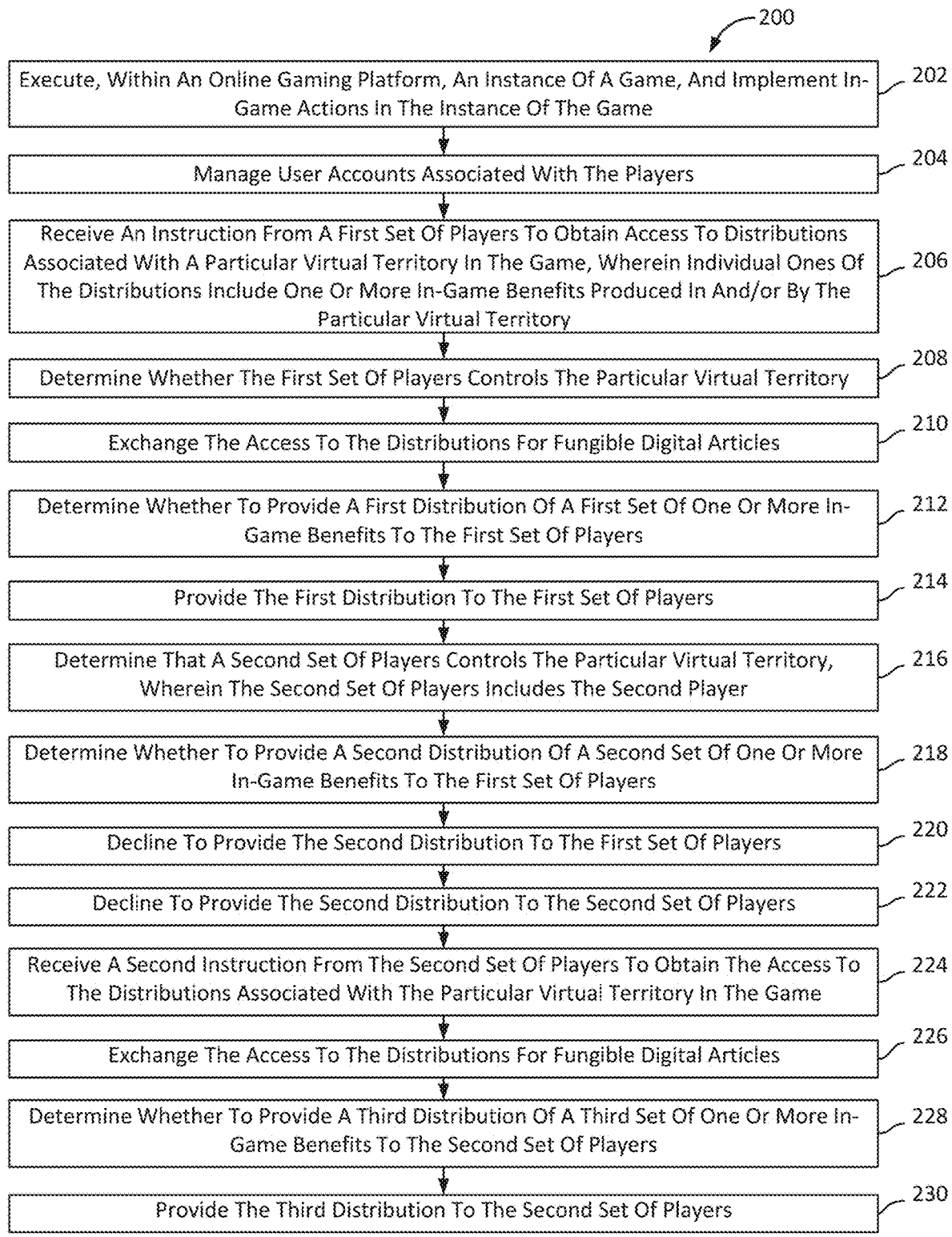
FIG. 2 illustrates a method of controlling benefit-producing virtual territories in an online gaming platform, in accordance with one or more implementations.

FIG. 2 illustrates a method 200 of controlling benefit-producing virtual territories in an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed, within the online gaming platform, to facilitate presentation of the game to players, and in-game actions are implemented in the instance of the game in response to in-game action instructions for the in-game actions by the players. Presentation of the game is based on views of the game that are determined during execution of the instance of the game. The players include a first player and a second player. In some embodiments, operation 202 is performed by a game component and/or an interaction component the same as or similar to game component 108 and/or interaction component 110 (shown in FIG. 1 and described herein).

At an operation 204, player accounts associated with the players are managed. The player accounts include a first player account associated with the first player and a second player account associated with the second player. In some embodiments, operation 204 is performed by an account component the same as or similar to account component 112 (shown in FIG. 1 and described herein).

At an operation 206, an instruction is received from a first set of players to obtain access to distributions associated with a particular virtual territory in the game. Individual ones of the distributions include one or more in-game benefits produced in and/or by the particular virtual territory. The first set of players includes the first player. In some embodiments, operation 206 is performed by an access component the same as or similar to access component 114 (shown in FIG. 1 and described herein).

At an operation 208, it is determined whether the first set of players controls the particular virtual territory. In some embodiments, operation 208 is performed by a territory component the same as or similar to territory component 116 (shown in FIG. 1 and described herein).

At an operation 210, responsive to a determination the first set of players controls the particular virtual territory, the access to the distributions is exchanged for a particular amount of fungible digital articles. In some embodiments, operation 210 is performed by an access component the same as or similar to access component 114 (shown in FIG. 1 and described herein).

At an operation 212, it is determined whether to provide a first distribution of a first set of one or more in-game benefits to the first set of players, in accordance with the access to the distributions. Determining includes verifying whether the first set of players continues to control the particular virtual territory. In some embodiments, operation 212 is performed by a distribution component the same as or similar to distribution component 118 (shown in FIG. 1 and described herein).

At an operation 214, responsive to a determination the first set of players continues to control the particular virtual territory, the first distribution of the first set of one or more in-game benefits is provided to the first set of players, in accordance with the access to the distributions. In some embodiments, operation 214 is performed by a distribution component the same as or similar to distribution component 118 (shown in FIG. 1 and described herein).

At an operation 216, it is determined that a second set of players controls the particular virtual territory. The second set of players includes the second player. The second set of players is different from the first set of players. In some embodiments, operation 216 is performed by a territory component the same as or similar to territory component 116 (shown in FIG. 1 and described herein).

At an operation 218, it is determined whether to provide a second distribution of a second set of one or more in-game benefits to the first set of players, in accordance with the access to the distributions. Determining includes verifying whether the first set of players continues to control the particular virtual territory. In some embodiments, operation 218 is performed by a distribution component the same as or similar to distribution component 118 (shown in FIG. 1 and described herein).

At an operation 220, responsive to a determination the first set of players no longer controls the particular virtual territory, the second distribution of the second set of one or more in-game benefits is declined to be provided to the first set of players. In some embodiments, operation 220 is performed by a distribution component the same as or similar to distribution component 118 (shown in FIG. 1 and described herein).

At an operation 222, responsive to a determination the second set of players does not have the access to the distributions associated with the particular virtual territory, the second distribution of the second set of one or more in-game benefits is declined to be provided to the second set of players. In some embodiments, operation 222 is performed by a distribution component the same as or similar to distribution component 118 (shown in FIG. 1 and described herein).

At an operation 224, a second instruction is received from the second set of players to obtain the access to the distributions associated with the particular virtual territory in the game. In some embodiments, operation 224 is performed by an access component the same as or similar to access component 114 (shown in FIG. 1 and described herein).

At an operation 226, responsive to a determination the second set of players controls the particular virtual territory, the access to the distributions for a second particular amount of fungible digital articles is exchanged. In some embodiments, operation 226 is performed by a territory component and/or an access component the same as or similar to territory component 116 and/or access component 114 (shown in FIG. 1 and described herein).

At an operation 228, it is determined whether to provide a third distribution of a third set of one or more in-game benefits to the second set of players, in accordance with the access to the distributions. Determining includes verifying whether the second set of players continues to control the particular virtual territory. In some embodiments, operation 228 is performed by a distribution component the same as or similar to distribution component 118 (shown in FIG. 1 and described herein).

At an operation 230, responsive to a determination the second set of players continues to control the particular virtual territory, the third distribution of the third set of one or more in-game benefits is provided to the second set of players, in accordance with the access to the distributions. In some embodiments, operation 230 is performed by a distribution component the same as or similar to distribution component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to control distributions produced in or by benefit-producing virtual territories in an online gaming platform, the system comprising:
   the online gaming platform including one or more hardware processors configured by machine-readable instructions to:
   execute, within the online gaming platform, an instance of a game to facilitate presentation of the game to players, and implement in-game actions in the instance of the game in response to in-game action instructions for the in-game actions by the players, wherein presentation of the game is based on views of the game that are determined during execution of the instance of the game, wherein the players include a first player and a second player;

manage player accounts associated with the players, wherein the player accounts include a first player account associated with the first player and a second player account associated with the second player;

receive an instruction from a first set of players to obtain access to distributions associated with a particular virtual territory in the game, wherein individual ones of to the distributions include one or more in-game benefits produced in and/or by the particular virtual territory, wherein the first set of players includes the first player;

determine whether the first set of players controls the particular virtual territory;

responsive to a determination the first set of players controls the particular virtual territory, exchange the access to the distributions for a particular amount of fungible digital articles, wherein the fungible digital articles are implemented as tradeable fungible tokens on a permanent registry that implements a blockchain that is public, and wherein ownership of the access to the distributions is recorded on the blockchain using a first blockchain transaction;

determine whether to provide a first distribution of a first set of one or more in-game benefits to the first set of players, in accordance with the ownership of the access to the distributions being recorded on the blockchain as the first set of players, wherein determining includes verifying whether the first set of players continues to control the particular virtual territory, wherein the first set of one or more in-game benefits includes in-game benefits produced in and/or by the particular virtual territory;

responsive to a determination the first set of players continues to control the particular virtual territory, provide the first distribution of the first set of one or more in-game benefits to the first set of players;

determine that a second set of players controls the particular virtual territory, wherein the second set of players includes the second player, wherein the second set of players is different from the first set of players;

determine whether to provide a second distribution of a second set of one or more in-game benefits produced in and/or by the particular virtual territory to the first set of players, in accordance with the ownership of the access to the distributions being recorded on the blockchain as the first set of players, wherein determining includes verifying whether the first set of players continues to control the particular virtual territory;

responsive to a determination the first set of players no longer controls the particular virtual territory, decline to provide the second distribution of the second set of one or more in-game benefits to the first set of players;

responsive to a determination the second set of players does not have the access to the distributions associated with the particular virtual territory, decline to provide the second distribution of the second set of one or more in-game benefits to the second set of players;

receive a second instruction from the second set of players to obtain the access to the distributions associated with the particular virtual territory in the game;

responsive to a determination the second set of players controls the particular virtual territory, exchange the access to the distributions for a second particular amount of fungible digital articles such that the ownership of the access to the distributions belongs to the second set of players, wherein the ownership of the access to the distributions is recorded on the blockchain using a second blockchain transaction;

determine whether to provide a third distribution of a third set of one or more in-game benefits produced in and/or by the particular virtual territory to the second set of players, in accordance with the ownership of the access to the distributions being recorded on the blockchain as the second set of players, wherein determining includes verifying whether the second set of players continues to control the particular virtual territory; and responsive to a determination the second set of players continues to control the particular virtual territory, provide the third distribution of the third set of one or more in-game benefits to the second set of players.

2. The system of claim 1, wherein the first set of one or more in-game benefits include a portion of the particular amount of fungible digital articles, and wherein a combination of different sets of in-game benefits distributed over time and associated with the particular virtual territory in the game do not exceed the particular amount of fungible digital articles.

3. The system of claim 1, wherein usage rights pertaining to the fungible digital articles are recorded on the permanent registry, wherein a first account on the permanent registry is associated with the first player, wherein the first account has a first balance of fungible digital articles, and wherein exchanging the access to the distributions for the particular amount of fungible digital articles reduces the first balance by no more than the particular amount of fungible digital articles.

4. The system of claim 1, wherein the access to the distributions associated with the particular virtual territory in the game are implemented as one or more non-fungible tokens on the permanent registry, wherein the second set of players can sell the access to the distributions to a third set of players.

5. The system of claim 1, wherein subsequent distributions of particular sets of in-game benefits become available at regular intervals subsequent to determinations that a particular set of players controls the particular virtual territory.

6. The system of claim 1, wherein the determination that the first set of players controls the particular virtual territory includes determining whether an in-game account inventory of an individual player in the first set of players includes a particular virtual item in the instance of the game.

7. The system of claim 1, wherein the determination that the first set of players controls the particular virtual territory includes determining whether at least a predetermined number of individual players in the first set of players is located within the particular virtual territory.

8. The system of claim 1, wherein the determination that the first set of players controls the particular virtual territory includes determining whether at least a predetermined percentage of the individual players in the first set of players is located within the particular virtual territory.

9. The system of claim 1, wherein a particular amount of fungible digital articles required for exchanging the access to the distributions associated with the particular virtual territory in the game changes according to a monotonic function over time.

10. A method of controlling distributions produced in or by benefit-producing virtual territories in an online gaming platform, the method comprising:

executing, within the online gaming platform, an instance of a game to facilitate presentation of the game to players, and implementing in-game actions in the instance of the game in response to in-game action instructions for the in-game actions by the players, wherein presentation of the game is based on views of the game that are determined during execution of the instance of the game, wherein the players include a first player and a second player;

managing player accounts associated with the players, wherein the player accounts include a first player account associated with the first player and a second player account associated with the second player;

receiving an instruction from a first set of players to obtain access to distributions associated with a particular virtual territory in the game, wherein individual ones of the distributions include one or more in-game benefits produced in and/or by the particular virtual territory, wherein the first set of players includes the first player;

determining whether the first set of players controls the particular virtual territory;

responsive to a determination the first set of players controls the particular virtual territory, exchanging the access to the distributions for a particular amount of fungible digital articles, wherein the fungible digital articles are implemented as tradeable fungible tokens on a permanent registry that implements a blockchain that is public, and wherein ownership of the access to the distributions is recorded on the blockchain using a first blockchain transaction;

determining whether to provide a first distribution of a first set of one or more in-game benefits to the first set of players, in accordance with the ownership of the access to the distributions being recorded on the blockchain as the first set of players, wherein determining includes verifying whether the first set of players continues to control the particular virtual territory, wherein the first set of one or more in-game benefits includes in-game benefits produced in and/or by the particular virtual territory;

responsive to a determination the first set of players continues to control the particular virtual territory, providing the first distribution of the first set of one or more in-game benefits to the first set of players;

determining that a second set of players controls the particular virtual territory, wherein the second set of players includes the second player, wherein the second set of players is different from the first set of players;

determining whether to provide a second distribution of a second set of one or more in-game benefits produced in and/or by the particular virtual territory to the first set of players, in accordance with the ownership of the access to the distributions being recorded on the blockchain as the first set of players, wherein determining includes verifying whether the first set of players continues to control the particular virtual territory;

responsive to a determination the first set of players no longer controls the particular virtual territory, declining to provide the second distribution of the second set of one or more in-game benefits to the first set of players;

responsive to a determination the second set of players does not have the access to the distributions associated with the particular virtual territory, declining to provide the second distribution of the second set of one or more in-game benefits to the second set of players;

receiving a second instruction from the second set of players to obtain the access to the distributions associated with the particular virtual territory in the game;

responsive to a determination the second set of players controls the particular virtual territory, exchanging the access to the distributions for a second particular amount of fungible digital articles such that the ownership of the access to the distributions belongs to the second set of players, wherein the ownership of the access to the distributions is recorded on the blockchain using a second blockchain transaction;

determining whether to provide a third distribution of a third set of one or more in-game benefits produced in and/or by the particular virtual territory to the second set of players, in accordance with the ownership of the access to the distributions being recorded on the blockchain as the second set of players, wherein determining includes verifying whether the second set of players continues to control the particular virtual territory; and responsive to a determination the second set of players continues to control the particular virtual territory, providing the third distribution of the third set of one or more in-game benefits to the second set of players.

11. The method of claim 10, wherein the first set of one or more in-game benefits include a portion of the particular amount of fungible digital articles, and wherein a combination of different sets of in-game benefits distributed over time and associated with the particular virtual territory in the game do not exceed the particular amount of fungible digital articles.

12. The method of claim 10, wherein usage rights pertaining to the fungible digital articles are recorded on the permanent registry, wherein a first account on the permanent registry is associated with the first player, wherein the first account has a first balance of fungible digital articles, and wherein exchanging the access to the distributions for the particular amount of fungible digital articles reduces the first balance by no more than the particular amount of fungible digital articles.

13. The method of claim 10, wherein the access to the distributions associated with the particular virtual territory in the game are implemented as one or more non-fungible tokens on the permanent registry, wherein the second set of players can sell the access to the distributions to a third set of players.

14. The method of claim 10, wherein subsequent distributions of particular sets of in-game benefits become available at regular intervals subsequent to determinations that a particular set of players controls the particular virtual territory.

15. The method of claim 10, wherein the determination that the first set of players controls the particular virtual territory includes determining whether an in-game account inventory of an individual player in the first set of players includes a particular virtual item in the instance of the game.

16. The method of claim 10, wherein the determination that the first set of players controls the particular virtual territory includes determining whether at least a predetermined number of individual players in the first set of players is located within the particular virtual territory.

17. The method of claim 10, wherein the determination that the first set of players controls the particular virtual territory includes determining whether at least a predetermined percentage of the individual players in the first set of players is located within the particular virtual territory.

18. The method of claim 10, wherein a particular amount of fungible digital articles required for exchanging the access to the distributions associated with the particular virtual territory in the game changes according to a monotonic function over time.

* * * * *